United States Patent [19]

Shirota et al.

[11] Patent Number: 5,141,558
[45] Date of Patent: Aug. 25, 1992

[54] INK, INK-JET RECORDING PROCESS, AND INSTRUMENT USING THE INK

[75] Inventors: Koromo Shirota, Kawasaki; Kyoko Fukushima; Shoji Koike, both of Yokohama, all of Japan

[73] Assignee: Canon Kabushiki Kaisha, Tokyo, Japan

[21] Appl. No.: 662,960

[22] Filed: Mar. 1, 1991

[30] Foreign Application Priority Data

Mar. 6, 1990 [JP] Japan .................................. 2-53953
Mar. 6, 1990 [JP] Japan .................................. 2-53954
Mar. 6, 1990 [JP] Japan .................................. 2-53955

[51] Int. Cl.⁵ .......................................... C09D 11/02
[52] U.S. Cl. ...................................... 106/22; 106/20
[58] Field of Search ............................... 106/20, 22

[56] References Cited

U.S. PATENT DOCUMENTS

| | | | |
|---|---|---|---|
| 4,309,061 | 12/1981 | Iwahashi et al. | 106/20 |
| 4,545,818 | 10/1985 | Inoue et al. | 106/22 |
| 4,671,691 | 6/1987 | Case et al. | 106/25 |
| 4,786,198 | 11/1988 | Zgambo | 106/22 |
| 5,013,361 | 5/1991 | Case et al. | 106/22 |

FOREIGN PATENT DOCUMENTS

| | | |
|---|---|---|
| 55-29546 | 3/1980 | Japan . |
| 56-57862 | 5/1981 | Japan . |
| 027761 | 2/1983 | Japan . |
| 61-92883 | 5/1986 | Japan . |
| 1-126382 | 5/1989 | Japan . |

OTHER PUBLICATIONS

Derwent Abstract (WPI) No. 89-188435 with respect to Japanese Patent Document No. 01-126382 (May 18, 1989).

Derwent Abstract (WPI) No. 86-159547 with respect to Japanese Patent Document No. 61-092883 (May 10, 1986).

*Primary Examiner*—William R. Dixon, Jr.
*Assistant Examiner*—Helene Klemanski
*Attorney, Agent, or Firm*—Fitzpatrick, Cella, Harper & Scinto

[57] ABSTRACT

Provided in an ink comprising a recording agent and a liquid medium capable of dissolving or dispersing the recording agent, wherein said ink comprises a triol selected from the group consisting of the following (a) to (c):

(a) a straight-chain triol having 5 carbon atoms;
(b) a compound of the formula

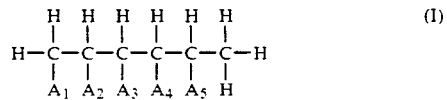

wherein any three of $A_1$ to $A_5$ each represent a hydroxyl group, and the remaining two each represent a hydrogen atom, or a branched triol having 6 carbon atoms; and
(c) a triol having 7 or more carbon atoms.

3 Claims, 3 Drawing Sheets

INK, INK-JET RECORDING PROCESS, AND INSTRUMENT USING THE INK

BACKGROUND OF THE INVENTION

1. Field of the Invention

The present invention relates to an ink, an ink-jet recording process, and an instrument making use of the ink. More particularly it relates to an ink, an ink-jet recording process, a recording unit, an ink-jet recording apparatus and an ink cartridge that are capable of achieving highly detailed and high-image quality recording not only on coated paper specially prepared for ink jet recording but also on non-coated paper such as paper for copying, paper for reporting, notepaper, letter paper, bond paper or continuous slip paper, i.e., what is called a plain paper, commonly used in offices and homes.

2. Related Background Art

Inks with greatly various manners of being composed have been hitherto reported in respect of inks for an ink-jet recording. In particular, in recent years, detailed research and developments have been made from various approaches such as composition and physical properties of inks so that a good record can be made even on a plain paper such as paper for copying, paper for reporting, notepaper, letter paper, bond paper or continuous slip paper, commonly used in offices.

For example, inks usually contain high-boiling organic solvents such as glycols for the purposes of anti-drying, anti-clogging and so forth. When recording is carried out using such inks on a plain paper having a high degree of sizing, ink does not readily penetrate into the paper and the part on which a record has been made does not well dry, so that when recorded characters or the like are touched, the hand may be stained with ink, or the characters are rubbed to become smeared. Thus, there has been a problem on fixing performance.

Under such circumstances, in order to increase the penetrability of ink into paper, Japanese Patent Application Laid-open No. 55-29546 proposes a method in which a surface active agent is added in ink in a large quantity. In such an instance, however, the following troubles have been caused: Feathering occurs very frequently on some kind of paper; when filled in an ink-jet recording head, the ink recedes from the orifice surface depending on the structural conditions of the head, resulting in no ejection of ink, or on the other hand the whole of the orifice surface becomes wet, also resulting in no ejection of ink.

Japanese Patent Application Laid-open No. 56-57862 also proposes a method in which the pH of ink is set to the alkaline side. In this instance, however, there are the disadvantages such that the ink is harmful when touched with hands or that no good results cannot be obtained in view of both feathering and drying performance when the ink is used on a paper containing a certain kind of sizing agent, e.g., a neutralized paper.

Besides the foregoing, various improvements have been attempted. Up to the present, however, no ink is known which can settle all the above problems on feathering, drying performance and safety of ink, and also the problem of clogging.

SUMMARY OF THE INVENTION

Accordingly, an object of the present invention is to provide an ink capable of giving a superior print quality level, that has settled the problems on the feathering of ink and the drying retardation of printed characters or the like, occurring when recording is carried out on a non coated paper such as paper for copying, paper for reporting, notepaper, letter paper, bond paper or continuous slip paper, i.e., what is called a plain paper, commonly used in offices and so forth; and to provide an ink-jet recording process and an instrument making use of the ink.

Another object of the present invention is to provide an ink for ink-jet recording, having a high degree of safety even when used in offices and homes.

Still another object of the present invention is to provide an ink that is not liable to cause clogging at the nozzles of a head for ink-jet recording, and also has a good reliability The above objects of the present invention can be achieved by the present invention described below. The present invention provides an ink comprising a recording agent and a liquid medium capable of dissolving or dispersing the recording agent, wherein said ink contains a triol selected from the group consisting Of the following (a) to (c):

(a) A straight-chain triol having 5 carbon atoms.

(b) A compound of the formula

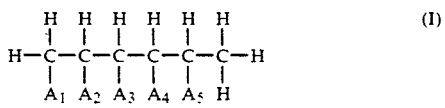

wherein any three of $A_1$ to $A_5$ each represent a hydroxyl group, and the remaining two each represent a hydrogen atom, or a branched triol having 6 carbon atoms.

(c) A triol having 7 or more carbon atoms.

The present invention also provides an ink-jet recording process comprising ejecting ink droplets from an orifice in accordance with a recording signal to make a record on a recording medium, wherein the ink as described above is used.

The present invention still also provides a recording unit comprising an ink container portion that holds an ink and a head from which the ink is ejected in the form of ink droplets, wherein the ink as described above is used.

The present invention further provides an ink cartridge comprising an ink container portion that holds an ink, wherein the ink as described above is used.

The present invention still further provides an ink-jet recording apparatus comprising a recording unit comprising an ink container portion that has held an ink and a head from which the ink is ejected in the form of ink droplets, wherein the ink as described above is used.

The present invention still further provides an ink-jet recording apparatus comprising a recording head from which ink droplets are ejected, an ink cartridge having an ink container portion that holds an ink, and an ink feeder that feeds ink from said ink cartridge to said recording head, wherein the ink as described above is used as ink.

DESCRIPTION OF THE PREFERRED EMBODIMENTS

Figure 1A:
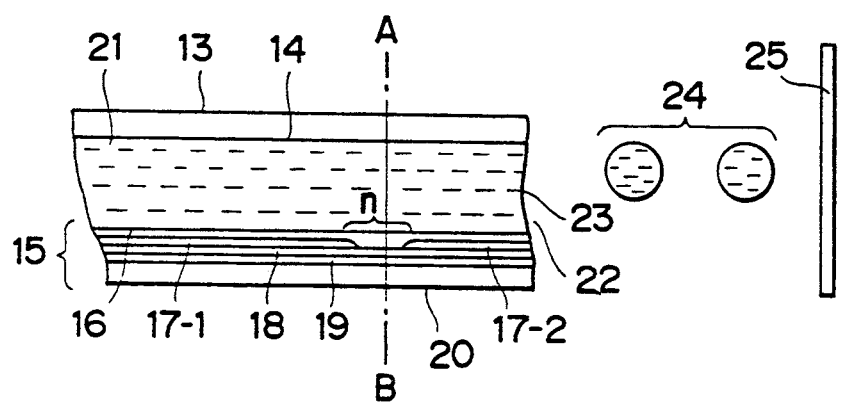
FIGS. 1A and 1B illustrate a longitudinal cross section and a transverse cross section, respectively, of a head of an ink-jet recording apparatus.

The present inventors have made intensive studies on various manners of ink compositions with good reliability, that can improve anti-feathering, drying performance and penetrability of ink on plain paper, and also is not liable to cause clogging at nozzles of a head for ink jet recording. As a result, they have discovered that an ink containing any of (a) a straight-chain triol having 5 carbon atoms;
(b) a compound represented by the above Formula (I) or a branched triol having 6 carbon atoms; and
(c) a triol having 7 or more carbon atoms can be well balanced in anti-feathering and penetrability and also can achieve particularly good anti-clogging. Thus they have accomplished the present invention.

According to what is known by the present inventors, as conventional agents for preventing inks from causing clogging, glycols such as polyethylene glycol, and glycerol have been used, among which glycerol has been used as a particularly preferred anti-clogging agent because it can prevent clogging by its addition in a relatively small quantity and also it is not liable to cause feathering of ink on plain paper. This glycerol, however, has a poor wettability to a sizing agent present in paper and therefore has the disadvantage that it gives a greatly poor ink drying performance or penetrability on the surface of some kind of paper.

On the other hand, the triols of the above (a) to (c) have the same anti-clogging effect similar to glycerol and yet have very well balanced anti-feathering and penetrability of the ink.

The reasons therefor can be presumed as follows. The present compounds each have a low vapor pressure and also have three hydroxyl groups like glycerol, and hence have a superior dissolving power or dispersibility of coloring matters, so that a good anti-clogging effect can be obtained. In addition, they each have a hydrophilic part and a hydrophobic part together in the molecule because of their larger number of carbon atoms than glycerol, and hence can be contributory to a good wettability to sizing agents, so that the penetrability of ink on the surface of paper can be remarkably improved.

The present invention will be described below in detail by giving preferred embodiments.

Examples of the compounds that are used in the present invention and characterize the present invention are as described below. The present invention is by no means limited to these exemplary compounds.

Straight-chain triols having 5 carbon atoms

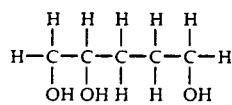
Compound a-1

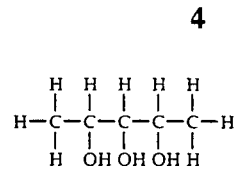
Compound a-2

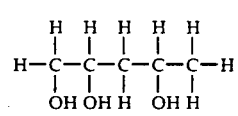
Compound a-3

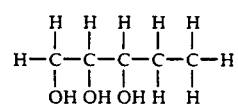
Compound a-4

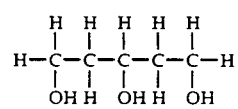
Compound a-5

Compounds represented by Formula (I) or branched triols having 6 carbon atoms

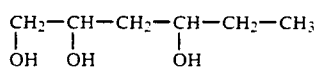
Compound b-1

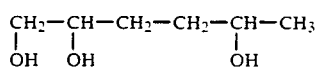
Compound b-2

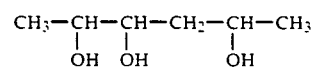
Compound b-3

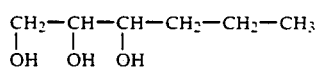
Compound b-4

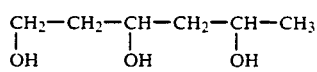
Compound b-5

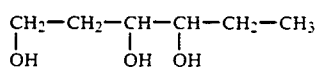
Compound b-6

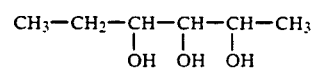
Compound b-7

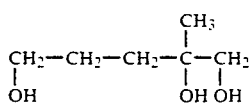
Compound b-8

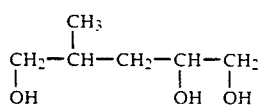 Compound b-9
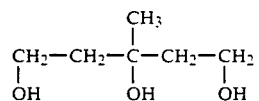 Compound b-10
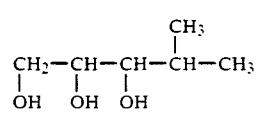 Compound b-11
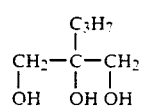 Compound b-12
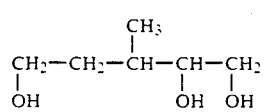 Compound b-13
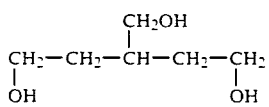 Compound b-14
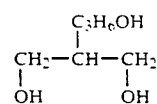 Compound b-15
Triols having 7 or more carbon atoms
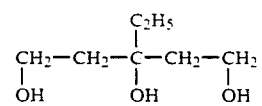 Compound c-1
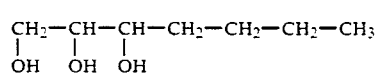 Compound c-2
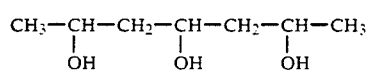 Compound c-3
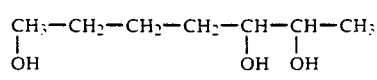 Compound c-4
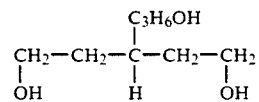 Compound c-5
Compound c-6
Compound c-7
Compound c-8
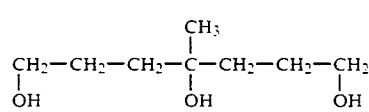 Compound c-9
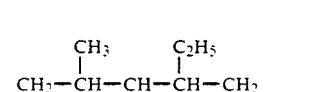 Compound c-10
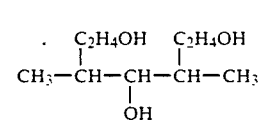 Compound c-11
Compound c-12
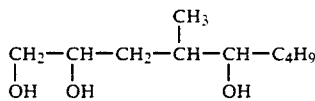 Compound c-13
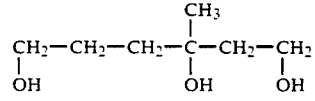 Compound c-14
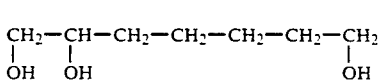 Compound c-15
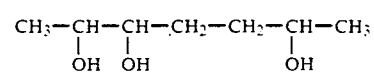 Compound c-16

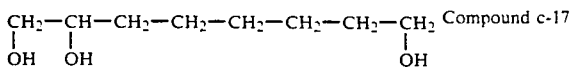

Compound c-17: CH₂—CH—CH₂—CH₂—CH₂—CH₂—CH₂—CH₂ with OH at positions 1, 2, and 8

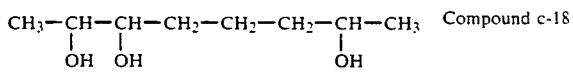

Compound c-18: CH₃—CH—CH—CH₂—CH₂—CH₂—CH—CH₃ with OH at positions 2, 3, and 7

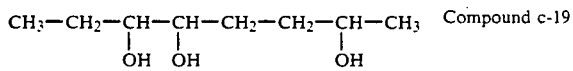

Compound c-19: CH₃—CH₂—CH—CH—CH₂—CH₂—CH—CH₃ with OH at positions 3, 4, and 7

The above examples have been selected by the present inventors as particularly preferred ones as a result of their intensive studies. The triols having 7 or more carbon atoms may more preferably include triols having 7 to 10 carbon atoms.

The triols as described above may be used alone or in the form of a mixture. The amount of any of these triols to be added in the ink may vary depending on coloring matters used and other liquid medium components used in combination. It may be in the range of approximately from 0.01% to 50% by weight, preferably from 0.1% to 30% by weight, and more preferably from 1% to 20% by weight, based on the ink.

The ink of the present invention, used for ink-jet recording, is characterized by containing the triol(s) as described above, together with a coloring matter. It is also possible to use in combination, water and commonly available organic solvents used in other conventionally known inks. Such organic solvents may include alcohols having 1 to 5 carbon atoms, such as methyl alcohol, ethyl alcohol, n-propyl alcohol, iso-propyl alcohol, n-butyl alcohol, sec-butyl alcohol, tert-butyl alcohol, iso-butyl alcohol and n-pentanol amides such as dimethylformamide and dimethylacetamide; ketones or ketoalcohols such as acetone and diacetone alcohol; ethers such as tetrahydrofuran and dioxane; oxyethylene or oxypropylene addition polymers such as diethylene glycol, triethylene glycol, tetraethylene glycol, dipropylene glycol, tripropylene glycol, polyethylene glycol and polyproplene glycol; alkylene glycols whose alkylene group has 2 to 6 carbon atoms, such as ethylene glycol, propylene glycol, trimethylene glycol, butylene glycol, 1,2,6-hexanetriol and hexylene glycol; thiodiglycol; glycerol; lower alkyl ethers of polyhydric alcohols, such as ethylene glycol monomethyl or -ethyl ether, diethylene glycol monomethyl or -ethyl ether and triethylene glycol monomethyl or -ethyl ether; lower dialkyl ethers of polyhydric alcohols, such as triethylene glycol dimethyl or -ethyl ether and tetraethylene glycol dimethyl or ethyl ether; sulfolane, N-methyl-2-pyrrolidone, and 1,3-dimethyl-2-imidazolidinone.

The above water-soluble organic solvent may be contained in an amount ranging from 1% to 50% by weight, and preferably from 2% to 30% by weight, based on the total weight of the ink.

The mediums as described above may be used alone or in the form of a mixture. The liquid medium may most preferably be composed of water and at least one kind of organic solvent, wherein the organic solvent contains at least one kind of water-soluble high-boiling organic solvent as exemplified by polyhydric alcohols such as diethylene glycol, triethylene glycol and glycerol.

The coloring matter that constitutes the ink of the present invention includes direct dyes, acid dyes, food dyes, basic dyes, reactive dyes, disperse dyes, vat dyes, soluble vat dyes, reactive disperse dyes, oil dyes, and all sorts of pigments. Among these, water-soluble dyes are particularly preferred in view of the performances of ink.

The amount of any of these coloring matters contained depends on the types of liquid medium components, the properties required in inks, etc. In general, it may be contained in an amount of approximately from 0.2% to 20% by weight, preferably from 0.5% to 10% by weight, and more preferably from 1% to 5% by weight.

The main components of the ink of the present invention are described above. Other various kinds of dispersants, surface active agents, viscosity modifiers, surface tension modifiers, fluorescent brightening agents and so forth may optionally be added so long as they do not hinder the objects of the present invention from being achieved.

For example, they include viscosity modifiers such as polyvinyl alcohol, celluloses and water-soluble resins; all sorts of surface active agents of a cationic anionic or nonionic type; surface tension modifiers such as diethanolamine and triethanolamine; pH adjusters comprising a buffer; and mildewproofing agents.

A resistivity modifier comprising an inorganic salt such as lithium chloride, ammonium chloride and sodium chloride may also be added in order to prepare an ink used in ink-jet recording of the type that the ink is electrically charged.

The ink of the present invention is particularly preferable in the case when applied in ink-jet recording of the type that the ink is ejected utilizing a phenomenon of ink bubbling caused by heat energy, and has the features that the ink can be ejected very stably and no satellite dots are generated. In this case, however, the values of thermal properties, e.g., specific heat, coefficient of thermal expansion, and thermal conductivity must be controlled in some instances.

The ink of the present invention can settle the problems concerning the feathering, the drying performance of recorded characters or the like and the penetrability that arise when recording is carried out on plain paper or the like. At the same time, it can match the recording head in an improved state. From these viewpoints, the physical properties of the ink itself should be controlled to give a surface tension of from 30 to 68 dyne/cm at 25° C. and a viscosity of not more than 15 cP, preferably not more than 10 cP, and more preferably not more than 5 cP.

Thus, in order to control the ink to have the above physical properties and settle the problems involved in the printing on plain paper, the ink of the present invention should preferably be controlled to have a water content of not less than 50% by weight and not more than 98% by weight, preferably not less than 60% by weight and not more than 95% by weight, and more preferably not less than 75% by weight and not more than 95% by weight.

The ink of the present invention can be particularly preferably used in the ink-jet recording in which recording is carried out by ejecting ink droplets by an action of heat energy. Needless to say, however, it can also be used for usual writing implements.

The method and apparatus suited to carry out recording by the use of the ink of the present invention may include a method and apparatus in which a heat energy corresponding with a recording signal is imparted to the ink held in the interior of a recording head so that ink droplets are generated by an action of the heat energy.

Figure 1B:
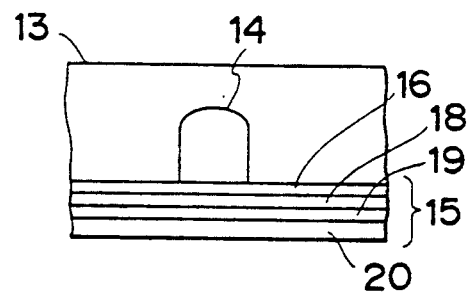
Figure 2:
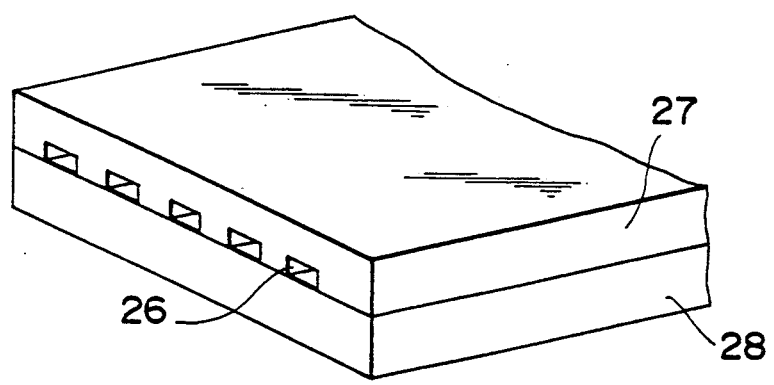
FIG. 2 is a perspective illustration of the appearance of a head comprised of a multiple set of the head as shown in FIGS. 1A and 1B.

FIGS. 1A, 1B and 2 show an example of the construction of the head, which is a main component of the apparatus.

A head 13 is formed by bonding a glass, ceramic or plastic plate or the like having a groove 14 through which ink is passed, to a heating head 15 used in thermal recording (the drawing shows a head, to which, however, is not limited). The heating head 15 is constituted of a protection layer 16 formed of silicon oxide or the like, a heating resistor layer 18 formed of aluminum electrodes 17-1 and 17-2, nichrome and so forth, a heat accumulating layer 19, and a substrate plate 20 with a good heat dissipation property.

The ink 21 reaches an ejection orifice 22 (a minute opening) and a meniscus 23 is formed there by a pressure P.

Now, upon application of electric signals to the electrodes 17-1 and 17-2, heat is abruptly generated at the region denoted by n in the heating head 15, so that bubbles are generated in the ink 21 coming into contact with this region. The pressure thus produced thrusts out the meniscus 23 and the ink 21 is ejected from the orifice 22 in the form of recording droplets 24 to fly against a recording medium 25. FIG. 2 illustrates a multi-head comprising the head as shown in FIG. 1A arranged in a large number. The multi-head is prepared by closely adhering a glass plate 27 having a multi-grooves 26, to a heating head 28 similar to the head as illustrated in FIG. 1A.

FIG. 1A is a cross-sectional view of the head 13 along its ink flow path, and FIG. 1B is a cross-sectional view along the line A-B in FIG. 1A.

Figure 3:
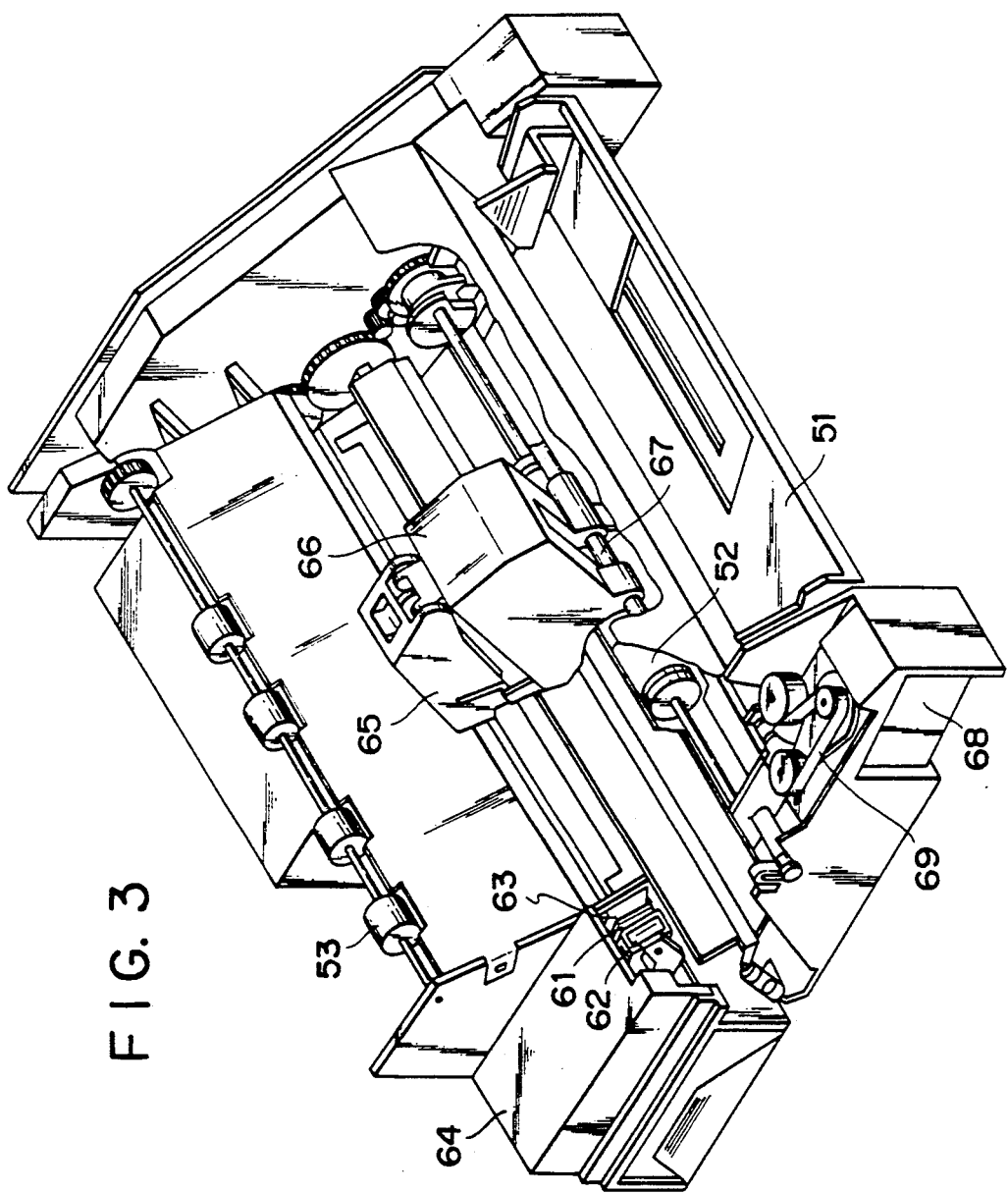
FIG. 3 is a perspective illustration of an example of ink-jet recording apparatus.

FIG. 3 shows an example of an ink-jet recording apparatus in which such a head has been incorporated.

In FIG. 3, reference numeral 61 denotes a blade serving as a wiping member, one end of which is a stationary end retained by a blade-retaining member. The blade 61 is provided at the position adjacent to the region in which a recording head makes a record. In the present example, the blade is retained into such a form that it protrudes to the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorption member provided adjoiningly to the blade 61, and, similar to the blade 61, is retained in such a form that it protrudes to the course through which the recording head is moved. The above blade 61, cap 62 and ink absorption member 63 constitute an ejection-recovery portion 61, where the blade 61 and the ink absorption member 63 remove water, dust or the like from the ink ejection opening face.

Reference numeral 65 denotes the recording head having an ejection energy generating means and ejects ink to the recording medium set oppositely to the ejection opening face provided with ejection openings, to carry out recording. Reference numeral 66 denotes a carriage on which the recording head 65 is mounted so that the recording head 65 can be moved. The carriage 66 is slideably associated with a guide rod 67. A part of the carriage 66 is connected (not shown) with a belt 69 drived by a motor 68. Thus, the carriage 66 can be moved along the guide rod 67 and hence the recording head 65 can be moved from a recording region to a region adjacent thereto.

Reference numeral 51 denotes a paper feeding part from which recording mediums are inserted, and 52, a paper feed roller driven by a motor (not shown). With such construction, the recording medium is fed to the position opposing to the ejection opening face of the recording head, and, with progress of recording, outputted from a paper output section provided with a paper output roller 53.

In the above constitution, the cap 62 of the ejection-recovery portion 64 is receded from the moving course of the recording head 65 when the recording head 65 is returned to its home position, e.g., after completion of recording, and the blade 61 stands protruded to the moving course. As a result, the ejection opening face of the recording head 65 is wiped. When the cap 62 comes into contact with the ejection opening face of the recording head 65 to carry out capping, the cap 62 is moved in such a way that it is protruded to the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 4:
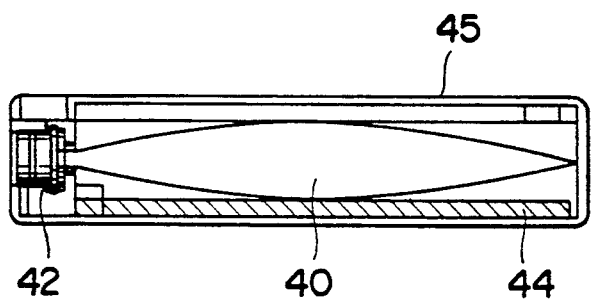
FIG. 4 is a longitudinal cross-sectional illustration of an ink cartridge.

FIG. 4 shows an example of an ink cartridge, denoted as 45, that has held the ink being fed to the head through an ink-feeding member as exemplified by a tube (not shown) Herein reference numeral 40 denotes an ink container portion that has held the feeding ink, as exemplified by an ink bag. The top thereof is provided with a stopper 42 made of rubber. A needle (not shown) may be inserted to this stopper 42 so that the ink in the ink container portion 40 can be fed to the head. Reference numeral 44 denotes an absorption member that receives waste ink.

It is preferred in the present invention that the ink container portion is formed of a polyolefin, in particular, polyethylene, at its surface with which the ink comes into contact.

Figure 5:
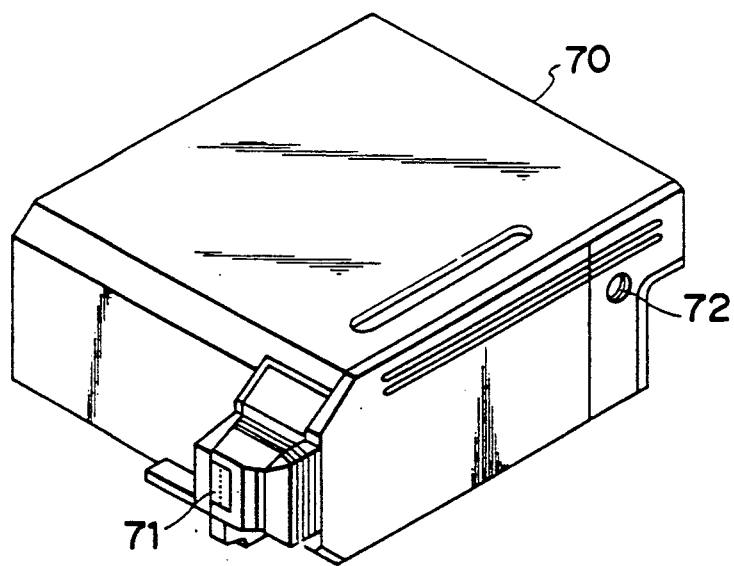
FIG. 5 is a perspective illustration of a recording unit.

The ink-jet recording apparatus used in the present invention may not be limited to the apparatus as described above in which the head and the ink cartridge are separately provided, and a device can also be preferably used in which these are integrally formed as shown in FIG. 5.

In FIG. 5, reference numeral 70 denotes a recording unit, in the interior of which an ink container portion that has held an ink, as exemplified by an ink absorption member, is contained. The recording unit is so constructed that the ink in such an ink absorption member is ejected in the form of ink droplets from a head 71 having a plurality of orifices. As a material for the ink absorption member, it is preferred in the present invention to use polyurethane.

Reference numeral 72 denotes an air path opening through which the interior of the recording unit communicates with the atmosphere.

This recording unit 70 can be used in place of the recording head shown in FIG. 3, and is detachably mounted to the carriage 66.

The present invention will be described below by giving Examples and Comparative Examples. In the following, "part(s)" and "%" are by weight unless particularly noted.

EXAMPLES 1 to 5

The respective components as shown below were mixed and stirred for 5 hours. Thereafter, the resulting solution was adjusted to have a pH value of 7.5 with an aqueous 0.1% sodium hydroxide solution and then subjected to pressure filtration using a membrane filter of 0.22 μm in pore size. Inks A to E of the present invention were thus obtained.

Next, recording was carried out using the resulting inks A to E and also using as an ink-jet recording apparatus the ink-jet printer BJ-130A (trade name; manufactured by Canon Inc.; rated driving frequency: 2.0 KHz) with a heater element as an energy source for the ejection of ink. The recording was carried out on commercially available paper for copying and bond paper to evaluate the fixing performance of recorded characters, the feathering occurrence, the anti-clogging when printing is re-started after a pause of printing, the anti-clogging when printing is re started after m long-term stop of printing, and the frequency response. Results obtained are shown in Table 1. Tests for the evaluation were usually carried out under conditions of 25° C. and 60% RH.

| Ink A: | |
|---|---|
| C.I. Direct Yellow 86 | 2 parts |
| Compound a-1 | 15 parts |
| Isopropyl alcohol | 2 parts |
| Water | 81 parts |

| Ink B: | |
|---|---|
| C.I. Acid Red 35 | 2 parts |
| Compound a-2 | 7 parts |
| Glycerol | 5 parts |
| Water | 86 parts |

| Ink C: | |
|---|---|
| C.I. Food Black 2 | 3 parts |
| Triethylene glycol | 6 parts |
| Compound a-3 | 6 parts |
| Ethanol | 3 parts |
| Water | 82 parts |

| Ink D: | |
|---|---|
| C.I. Direct Blue 199 | 2.5 parts |
| Diethylene glycol | 4 parts |
| Compound a-4 | 10 parts |
| n-Butanol | 2 parts |
| Water | 81.5 parts |

| Ink E: | |
|---|---|
| C.I. Direct Black 154 | 2 parts |
| Compound a-5 | 8 parts |
| Thiodiglycol | 3 parts |
| Diethylene glycol | 3 parts |
| Ethanol | 2 parts |
| Water | 82 parts |

COMPARATIVE EXAMPLES 1 to 5

Using the components as shown below, inks F to J of Comparative Examples 1 to 5 were obtained in the same manner as in Examples 1 to 5, and the evaluation on every item was made in the same manner as in Example 1. Results obtained are shown in Table 1.

| Ink F: | |
|---|---|
| C.I. Direct Yellow 86 | 2 parts |
| Glycerol | 15 parts |
| Isopropyl alcohol | 2 parts |
| Water | 81 parts |

| Ink G: | |
|---|---|
| C.I. Food Black 2 | 3 parts |
| Triethylene glycol | 12 parts |
| Ethanol | 3 parts |
| Water | 82 parts |

| Ink H: | |
|---|---|
| C.I. Direct Blue 199 | 2.5 parts |
| Diethylene glycol | 14 parts |
| n-Butanol | 2 parts |
| Water | 81.5 parts |

| Ink I: | |
|---|---|
| C.I. Direct Black 154 | 2 parts |
| Polyethylene glycol (molecular weight: 300) | 14 parts |
| Nonionic surface active agent (trade name: Nissan Nonion P-223; available from Nippon Oil & Fats Co., Ltd.) | 0.5 part |
| Water | 83.5 parts |

| Ink J: | |
|---|---|
| C.I. Food Black 2 | 3 parts |
| Ethylene glycol | 15 parts |
| Isopropyl alcohol | 2 parts |
| Water | 80 parts |

TABLE 1

| | Example: | | | | |
|---|---|---|---|---|---|
| | 1 | 2 | 3 | 4 | 5 |
| | Ink: | | | | |
| | A | B | C | D | E |
| Fixing performance:*1 | | | | | |
| Paper for copying | AA | AA | AA | AA | AA |
| Bond paper | AA | AA | AA | AA | AA |
| Feathering occurrence:*2 | | | | | |
| Paper for copying | A | A | A | A | A |
| Bond paper | A | A | A | A | A |

TABLE 1-continued

|  |  |  |  |  |  |
|---|---|---|---|---|---|
| Anti-clogging at the time of re-printing after pause:*3 | A | A | A | A | A |
| Anti-clogging at the time of re-printing after long-term stop:*4 | A | A | A | A | A |
| Frequency response:*5 | AA | AA | AA | AA | AA |

|  | Comparative Example: | | | | |
|---|---|---|---|---|---|
|  | 1 | 2 | 3 | 4 | 5 |
|  | Ink: | | | | |
|  | F | G | H | I | J |
| Fixing performance:*1 | | | | | |
| Paper for copying | C | B | B | AA | C |
| Bond paper | C | A | B | AA | B |
| Feathering occurrence:*2 | | | | | |
| Paper for copying | A | C | C | C | A |
| Bond paper | A | C | B | C | A |
| Anti-clogging at the time of re-printing after pause:*3 | C | B | B | C | C |
| Anti-clogging at the time of re-printing after long-term stop:*4 | A | B | C | B | C |
| Frequency response:*5 | C | B | B | B | C |

*1 Evaluation on fixing performance:

Characters were printed on commercially available paper for copying and bond paper, and then the printed characters were rubbed with a filter paper (trade name: No. 5C; available from Toyo Roshi K.K.) on lapse of 10 seconds and 30 seconds to make evaluation according to the following:

AA: Not blurred when rubbed on lapse of 10 seconds.
A: Slightly blurred when rubbed on lapse of 10 seconds.
B: Slightly blurred when rubbed on lapse of 30 seconds.
C: Greatly blurred when rubbed on lapse of 30 seconds.

*2 Feathering occurrence:

To examine the occurrence of feathering, 300 dots were printed with a printer on commercially available paper for copying and bond paper, in a discontinuous fashion. Thereafter, the printed dots were left to stand for 1 hour or more and then the number of dots on which the feathering occurred was counted through observation with a microscope. The proportion of the count to the total number of the dots was indicated by % to make evaluation according to the following:

A: 10% or less
B: 11% to 30%
C: 31% or more

*3 Anti-clogging at the time of re-printing after pause:

"Anti-clogging at the time of re-printing after pause" is meant to be the anti-clogging observed when printing is re-started after a temporary stop of printing. A given ink was charged in the printer, and English characters were continuously printed for 10 minutes and then the printing was stopped. After the printer was left to stand for 10 minutes in an uncapped state, English characters were again printed. The evaluation was made on whether or not there was defective print such as blurred characters or characters with unsharp edges.

A: No defective print is seen on the first and subsequent characters.
B: A part of the first character is blurred or has unsharp edges.
C: The first character can not be printed at all.

*4 Anti-clogging at the time of re-printing after long-term stop:

"Anti-clogging at the time of re-printing after long-term stop" is meant to be the anti-clogging observed when printing is re-started after the printing has been stopped for a long period of time. A given ink was charged in the printer, and English characters were continuously printed for 10 minutes and thereafter the printing was stopped. After the printer was left to stand for 7 days in an uncapped state, an operation for restoration of nozzles having clogged was carried out.

The evaluation was made on the basis of the times of the operation for restoration, carried out until normal printing becomes possible without defective print such as blurred characters or characters with unsharp edges.

A: Normal printing is possible after the operation for restoration is carried out once to 5 times.
B: Normal printing is possible after the operation for restoration is carried out 6 to 10 times.
C: Normal printing is possible after the operation for restoration is carried out 11 times or more.

*5 Frequency response:

The state of print obtained by the printing, i.e., defectiveness such as blurred characters or blank areas and defective ink-droplet impact such as splash or slippage were observed with the naked eye to make evaluation.

AA: The ink can be shot under good follow-up to the frequency, so that none of blurred characters, blank areas and defective ink-droplet impact are seen in both solid print and character print.
A: The ink can be shot under substantially good follow-up to the frequency, so that none of blurred characters, blank areas and defective ink-droplet impact are seen in character print, but with slightly blurred in solid print.
B: None of blurred characters and blank areas are seen in character print, but defective ink-droplet impact is partly seen. In solid print, blurred and blank areas are seen in about one-third of the whole of the solid print.
C: A large number of blurred and blank areas are seen in solid print, and a large number of blurred characters and defective ink-droplet impact are also seen in character print.

Examples 6 to 15

Inks K to T of the present invention were prepared in the same way as in Examples 1 to 5 except that the manners of ink composition in Examples 1 to 5 were altered as shown below. Evaluation was also made in the same way. Results obtained are shown in Table 2.

Ink K

In ink A, the compound a-1 used was replaced with compound b-10.

Ink L

In ink B, the compound a-2 used was replaced with compound b-4.

Ink M

In ink C, the compound a-3 used was replaced with compound b-2.

Ink N

In ink D, the compound a-4 used was replaced with compound b-5.

Ink O

In ink E, the compound a-5 used was replaced with compound b-14.

Ink P

In ink A, the compound a-1 used was replaced with compound c-1.

Ink Q

In ink B, the compound a-2 used was replaced with compound c-2.

Ink R

In ink C, the compound a-3 used was replaced with compound c-15.

Ink S

In ink D, the compound a-4 used was replaced with compound c-6.

Ink T

In ink E, the compound a-5 used was replaced with compound c-18.

TABLE 2

|  | Example: | | | | |
|---|---|---|---|---|---|
|  | 6 | 7 | 8 | 9 | 10 |
|  | Ink: | | | | |
|  | K | L | M | N | O |
| Fixing performance:*1 | | | | | |
| Paper for copying | AA | AA | AA | AA | A |
| Bond paper | AA | AA | AA | AA | AA |
| Feathering occurrence:*2 | | | | | |
| Paper for copying | A | A | A | A | A |
| Bond paper | A | A | A | A | A |
| Anti-clogging at the time of reprinting after pause:*3 | A | A | A | A | A |
| Anti-clogging at the time of reprinting after long-term stop:*4 | A | A | A | A | A |
| Frequency response:*5 | AA | AA | AA | AA | AA |
|  | Example: | | | | |
|  | 11 | 12 | 13 | 14 | 15 |
|  | Ink: | | | | |
|  | P | Q | R | S | T |
| Fixing performance:*1 | | | | | |
| Paper for copying | A | AA | A | AA | A |
| Bond paper | AA | AA | AA | AA | AA |
| Feathering occurrence:*2 | | | | | |
| Paper for copying | A | A | A | A | A |
| Bond paper | A | A | A | A | A |
| Anti-clogging at the time of reprinting after pause:*3 | A | A | A | A | A |
| Anti-clogging at the time of reprinting after long-term stop:*4 | A | A | A | A | A |
| Frequency response:*5 | AA | AA | AA | AA | AA |

As described above, it is possible according to the present invention to carry out recording with a superior quality level and a good fixing performance, causing no feathering even on plain paper such as paper for copying, paper for reporting, notepaper, letter paper, bond paper or continuous slip paper, commonly used in offices and so forth.

It is also possible according to the present invention to obtain an ink having a high safety even when used in offices and homes.

It is still also possible according to the ink of the present invention to carry out recording that may not cause clogging at the nozzles of a head for ink-jet recording and has a good reliability. In particular, the response to frequencies can be remarkably improved when the ink is applied in ink-jet recording of the type the ink is ejected utilizing a phenomenon of ink bubbling caused by heat energy.

Employment of such an ink makes it possible to provide an instrument having a high reliability.

What is claimed is:

1. An ink comprising a recording agent and a liquid medium capable of dissolving or dispersing the recording agent, wherein said ink comprises a straight chain triol having 5 or more carbon atoms consisting of carbon atoms, hydrogen atoms and hydroxyl groups, and wherein said triol to contained in an amount of from 0.01% to 50% by weight based on the total weight of the ink, with the proviso that when said triol has 6 carbon atoms, said triol is a compound of the formula (I)

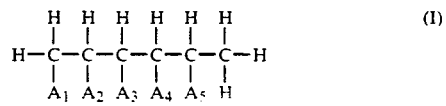

wherein any three of $A_1$ to $A_5$ each represent a hydroxyl group, and the remaining two each represent a hydrogen atom.

2. The ink according to claim 1, wherein said liquid medium comprises water.

3. The ink according to claim 2, wherein said water is contained in an amount of from 50% to 98% by weight based on the total weight of the ink.

* * * * *

UNITED STATES PATENT AND TRADEMARK OFFICE
CERTIFICATE OF CORRECTION

PATENT NO. : 5,141,558          Page 1 of 2
DATED : August 25, 1992
INVENTOR(S) : Shirota et al.

It is certified that error appears in the above-identified patent and that said Letters Patent is hereby corrected as shown below:

ON THE TITLE PAGE,
[30] Foreign Application Priority Data:

Insert: --Feb. 6, 1991 [JP] Japan 3-35012
            Feb. 6, 1991 [JP] Japan 3-35013
            Feb. 6, 1991 [JP] Japan 3-35014--.

[56] References Cited:

U.S. PATENT DOCUMENTS

"4,309,061" should read --4,308,061--.

COLUMN 1:

Line 38, "on" should read --of--; and

COLUMN 2:

Line 3, "non coated" should read --non-coated--;
   Line 22, "Of" should read --of--; and
   Line 53, "has held" should read --holds--.

COLUMN 7:

Line 38, "n-pentanol" should read --n-pentanol;--; and
   Line 45, "polyproplene" should read --polypropylene--.

COLUMN 8:

Line 24, "cationic" should read --cationic,--.

UNITED STATES PATENT AND TRADEMARK OFFICE
CERTIFICATE OF CORRECTION

PATENT NO. : 5,141,558
DATED : August 25, 1992
INVENTOR(S) : Shirota et al.

It is certified that error appears in the above-indentified patent and that said Letters Patent is hereby corrected as shown below:

COLUMN 9:

Line 12, "is" should read --it is--; and
Line 57, "portion 61," should read --portion 64,--.

COLUMN 11:

Line 31, "re started after m" should read --re-started after a--.

COLUMN 13:

Line 63, "can not" should read --cannot--.

Signed and Sealed this

Twenty-third Day of November, 1993

Attest:

BRUCE LEHMAN

Attesting Officer    Commissioner of Patents and Trademarks